United States Patent
Kolomeitsev

[11] Patent Number: 6,049,181
[45] Date of Patent: Apr. 11, 2000

[54] METHOD AND APPARATUS FOR REDUCING NOISE IN A VARIABLE RELUCTANCE MOTOR

[75] Inventor: Sergei Kolomeitsev, Saline, Mich.

[73] Assignee: Dana Corporation, Toledo, Ohio

[21] Appl. No.: 09/063,249

[22] Filed: Apr. 20, 1998

Related U.S. Application Data

[63] Continuation of application No. 08/690,172, Jul. 26, 1996, Pat. No. 5,742,139.

[51] Int. Cl.[7] .................................................. H02P 7/05
[52] U.S. Cl. ............................ 318/254; 318/701; 318/702
[58] Field of Search .................................. 318/685, 696, 318/254, 701, 702

[56] References Cited

U.S. PATENT DOCUMENTS

| | | | |
|---|---|---|---|
| 4,215,302 | 7/1980 | Chiang | 318/696 |
| 4,219,767 | 8/1980 | Wimmer | 318/696 |
| 4,235,053 | 11/1980 | Rosen . | |
| 4,282,472 | 8/1981 | Martin | 318/696 |
| 4,283,672 | 8/1981 | Throssell | 318/696 |
| 4,297,626 | 10/1981 | Chiang | 318/696 |
| 4,302,712 | 11/1981 | Pritchard | 318/490 |
| 4,520,303 | 5/1985 | Ward | 318/778 |
| 4,661,756 | 4/1987 | Murphy et al. | 318/701 |
| 4,868,477 | 9/1989 | Anderson et al. | 318/696 |
| 4,929,879 | 5/1990 | Wright et al. | 318/696 |
| 4,933,621 | 6/1990 | MacMinn et al. | 318/696 |
| 4,961,038 | 10/1990 | MacMinn | 318/696 |
| 5,072,166 | 12/1991 | Ehsani | 318/696 |
| 5,117,171 | 5/1992 | Bonss | 318/696 |
| 5,144,209 | 9/1992 | Inaji et al. | 318/254 |
| 5,182,499 | 1/1993 | Inaji et al. | 318/254 |
| 5,196,775 | 3/1993 | Harris et al. | 318/638 |
| 5,321,340 | 6/1994 | Tamaki et al. | 318/696 |
| 5,334,917 | 8/1994 | Lind | 318/254 |
| 5,334,920 | 8/1994 | Ito et al. | 318/685 |
| 5,446,359 | 8/1995 | Horst | 318/701 |
| 5,461,295 | 10/1995 | Horst | 318/701 |
| 5,483,139 | 1/1996 | Welles, II | 318/782 |
| 5,589,752 | 12/1996 | Iwasaki et al. | 318/701 |

FOREIGN PATENT DOCUMENTS

WO94/28618  12/1994  WIPO .

OTHER PUBLICATIONS

Analysis and Reduction of Vibration and Acoustic Noise in the Switched Reluctance Drive, IEEE Transactions Industry Application, vol. 31, No. 1, Jan./Feb. 1995.

Performance Enhancement of Single–Phase Switched Reluctance Motor by DC Link Voltage Boosting, IEE Proceedings–B, vol. 140, No. 5, Sep. 1993.

*Primary Examiner*—Bentsu Ro
*Attorney, Agent, or Firm*—Dykema Gossett PLLC

[57] ABSTRACT

A control circuit for a motor having at least two windings is used to optimize noise reduction by controlling the deenergization of each winding in a two-stage decay. The duration of the two-stage decay and particularly the first decaying current portion is controlled by a controller operatively coupled to a switch device. The duration of the first decaying current portion is varied between the various phases of the motor to provide optimum noise reduction.

18 Claims, 4 Drawing Sheets

METHOD AND APPARATUS FOR REDUCING NOISE IN A VARIABLE RELUCTANCE MOTOR

This application is a continuation of U.S. patent application Ser. No. 08/690,172 filed Jul. 26, 1996, now U.S. Pat. No. 5,742,139.

BACKGROUND OF THE INVENTION

1. Technical Field

This invention relates generally to a system for controlling a switched reluctance (SR) motor, and more particularly, to a method for providing noise reduction for an SR electric motor by controlling the current profile in the individual windings.

2. Discussion of the Related Art

Switched Reluctance Machines (SRMs) have been the subject of increased investigation due to their many advantages, which makes them suitable for use in a wide variety of applications. An SR machine operates on the basis of varying reluctance in its several magnetic circuits. In particular, such machines are generally doubly salient motors--that is, they have teeth or poles on both the stator and the rotor. The stator poles have windings which form machine phases of the motor. In a common configuration, stator windings on diametrically opposite poles are connected in series to form one machine phase.

When a machine phase is energized, the closest rotor pole pair is attracted towards the stator pole pair having the energized stator winding, thus minimizing the reluctance of the magnetic path. By energizing consecutive stator windings (i.e., machine phases) in succession, in a cyclical fashion, it is possible to develop torque, and thus rotation of the rotor in either a clockwise, or counter-clockwise direction. The inductance of a stator winding associated with the stator pole pair varies as a function of rotor position. Specifically, the inductance varies from a lower level, when a rotor pole is unaligned with a corresponding stator pole, to an upper or maximum level when the rotor pole and stator pole are in alignment. Thus, when a rotor pole rotates and sweeps past a stator pole, the inductance of the stator winding varies through lower-upper-lower inductance levels. This inductance-versus-rotor position characteristic is particularly relevant for controlled operation of the motor. Specifically, current flowing through the stator winding must be switched on (e.g., via power electronics) prior to, and maintained during the rising inductance period in order to develop a positive torque. Since positive phase current in the decreasing inductance interval produces a negative or breaking torque, the phase current must be switched off (e.g., by deenergizing the power electronics) before this interval occurs in order to avoid generating negative torque. Accordingly, rotor position sensing is an integral part of a closed-loop switched reluctance motor drive system so as to appropriately control torque generation.

The simple construction, low cost and fault tolerance of the power electronic drive circuitry of SRMs has made them desirable for applications in industrial and automotive applications. Due to the nature of the motor geometry and drive circuitry, SR motors may exhibit an undesirable level of audible noise compared to that of other types of motors. Reducing audible noise has thus been investigated in the prior art.

One source of noise has been traced to the deforming of the rotor and stator. In SR motors, the stator poles form a generally cylindrical chamber in which the rotor rotates the rotor poles form a generally cylindrical cross section. The rotor tends to align with the stator as the magnetic forces cause the rotor to be attracted to the stator. The magnetic forces cause the desired angular movement of the rotor relative to the stator. These forces, however, also tend to "ovalize" the rotor and stator. Ovalization occurs due to the magnetic forces deforming the rotor and stator in the direction of the forces. The audible noise is generated as the current in the winding is abruptly switched off due to the rotor and stator quickly returning to their undeformed shape.

One solution to reduce audible noise teaches identically controlling the deenergizing of each winding in two stages to gradually reduce the current so that a less abrupt change takes place. In this solution, each winding is energized using a higher current flow than that normally used. The current flow to the winding is then gradually reduced. When the winding reaches a commutation point; that is, when the motor is disconnected from the current source, the winding is allowed to naturally de-energize. Since the current is gradually reduced, less noise is generated by the motor. This technique, however, has been found to reduce noise only to a certain extent. Further noise reductions, however, are still desirable. Consequently, a need exists to provide an improved reduced noise switched reluctance machine to alleviate one or more of the problems set forth above.

SUMMARY OF THE INVENTION

The object of the present invention is to provide an improved control strategy for operating a motor, and has particular application to further reduce the noise in an SR motor beyond that provided by conventional approaches. The control strategy compensates for variations in the resonant frequencies throughout the motor geometry. The present invention recognizes that the current profiles for each motor phase must be considered individually to further reduce noise whereas conventional strategies treat each motor phase the same, that is, by providing the same current profile to each phase.

A preferred embodiment of the present invention provides a switch used to selectively couple current signals to the windings of the motors. A control means controls the switches to form an optimum current profile for each of the windings so that noise reduction in each of the motor phases is maximized. The optimum current profile for each winding is experimentally determined. Each profile varies between the various windings. These values are then stored in the memory of the controller.

In one aspect of the invention the current profile has an increasing current portion and a first and second decaying current portion. The duration of the first decreasing current portion is varied between the various phases of the motor.

In a preferred method for operating the motor, the controller retrieves the desired current profile for a particular winding from memory and energizes the winding according to the predetermined profile. The current profile information is used to de-energize the winding preferably in a two stage decay when the current in the winding is turned off (at the commutation point). The first stage of the two stage decay varies between the different windings. The duration of the first decaying current portion may be lengthened or shortened between windings to minimize audible noise. Each of the windings are likely to have different durations for the first decaying current portion.

The advantage of the present invention is that significant noise reductions have been achieved relative to conventional approaches since the current profile in each winding is tailored to reduce vibration.

BRIEF DESCRIPTION OF THE DRAWINGS

Other objects and advantages of the present invention will become apparent from the following detailed description which should be read in conjunction with the drawings in which.

DETAILED DESCRIPTION OF THE PREFERRED EMBODIMENT

Figure 1:
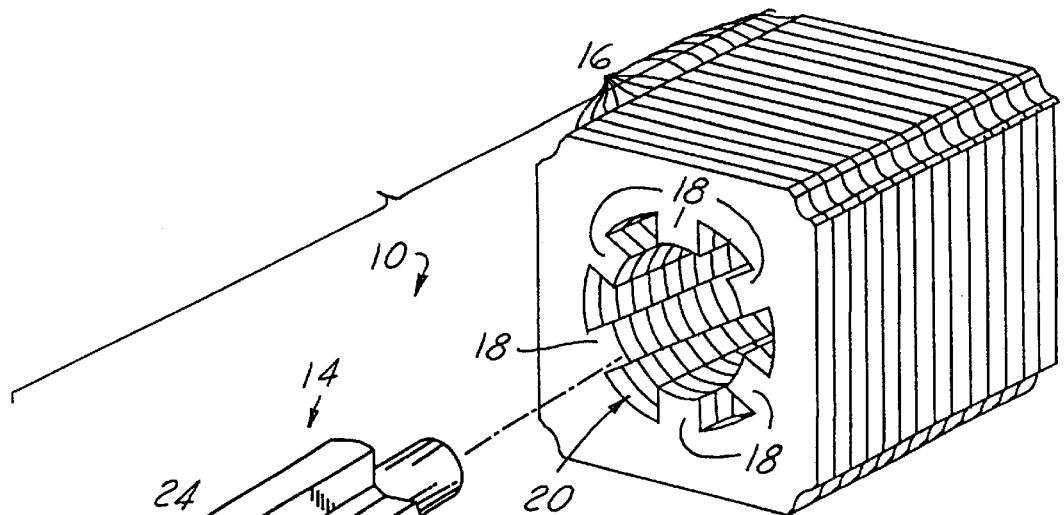
FIG. 1 is an exploded, perspective view of a portion of a switched reluctance electric motor suitable for use in connection with the preferred embodiment of the present invention.

Referring now to the drawings, like reference numerals are used to identify identical components in the various views. Although the invention will be described and illustrated in the context of a switched reluctance (SR) electric motor 10, it will be appreciated that this invention may be used in conjunction with other well-known electric motor structures.

FIG. 1 shows the major mechanical components of a switched reluctance electric motor 10, which includes a stator assembly 12 and a rotor assembly 14. Stator assembly 12, in a preferred embodiment, comprises a plurality of laminations 16. Laminations 16 are formed using a magnetically permeable material, such as iron.

Stator 12 is generally hollow and cylindrical in shape. A plurality of radially, inwardly extending poles 18 are formed on stator 12 (via laminations 16) and extend throughout the length thereof. Poles 18 are preferably provided in diametrically opposed pairs. The illustrated embodiment shows six poles 18. It should be appreciated, however, that a greater or lesser number of poles 18 may be provided in a particular configuration.

Each of the poles 18 may have a generally rectangular shape, when taken in cross-section. The radially innermost surfaces of the poles 18 are slightly curved so as to define an inner diameter representing a bore 20. Bore 20 is adapted in size to receive rotor assembly 14.

Rotor assembly 14, when assembled into stator 12 (best shown in FIG. 2) is coaxially supported within stator 12 for relative rotational movement by conventional means. Rotor assembly 14, for example, may be supported by conventional bearings (not shown) mounted in conventional end bells (not shown) secured to the longitudinal ends of stator 12. Rotor assembly 14 includes a generally cylindrical shaft 22 and rotor 24. Shaft 22 may be solid, although illustrated in FIG. 1 as being hollow. Rotor 24 is secured to shaft 22 for rotation therewith. For example, rotor 24 may be secured to shaft 22 by means of a spline (not shown), or other conventional means well-known in the art. Thus, it should be appreciated that shaft 22, and rotor 24 rotate together as a unit.

Rotor 24 includes the plurality of poles 26 formed on an outer surface thereof. Each pole 26 extends radially outwardly from the outer surface thereof and is formed having a generally rectangular shape, when taken in cross-section. Rotor poles 26 extend longitudinally throughout the entire length of the outer surface of rotor 24. The radially outermost surfaces of rotor poles 26 are curved so as to define an outer diameter, adapted in size to be received within the inner diameter defining bore 20. That is, the outer diameter formed by poles 26 is slightly smaller than the inner diameter defined the radially innermost curved surfaces of stator poles 18. Rotor poles 26 may also be provided in diametrically opposed pairs. Four (4) rotor poles 26 are provided on the illustrated rotor assembly 14; however, it should be appreciated that a greater or lesser number of rotor poles 26 may be provided. For SR motors, in general, the number of rotor poles 26 differs from the number of stator poles 18, as is well-known. Rotor 24, including poles 26, may be formed from a magnetically permeable material, such as iron.

Figure 2:
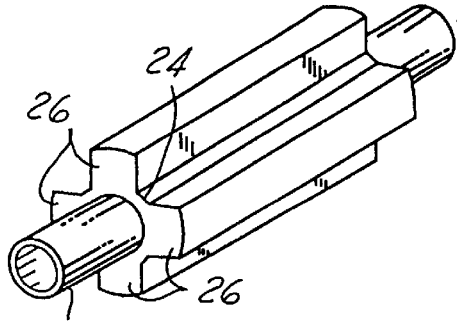
FIG. 2 is a diagrammatic, exaggerated, cross-sectional view of a switched reluctance electric motor illustrating the relative positions of a stator and rotor portions thereof.

Referring now to FIG. 2, a diagrammatic view of a cross-section of an assembled motor 10 is illustrated. In particular, as referred to above, poles 18 occur in pairs: i.e., AA', BB', and CC'. Rotor poles 26 also appear in pairs. Stator windings 28 (shown only on stator pole pair AA' for clarity) of diametrically opposite poles (e.g., AA') associated with stator 12 are connected in series to form one machine phase. Thus, the windings 28 on poles AA' are referred to as "machine phase A" of SR motor 10.

In the illustrated example, SR motor 10 also has a machine phase B, and a machine phase C. Each of these three machine phases may be energized individually, which, when done in a controlled manner, provides for rotation of rotor 24. Although a three-phase machine is described and illustrated, a machine having any number of phases greater than one is contemplated as falling within the spirit and scope of the present invention.

Figure 3:
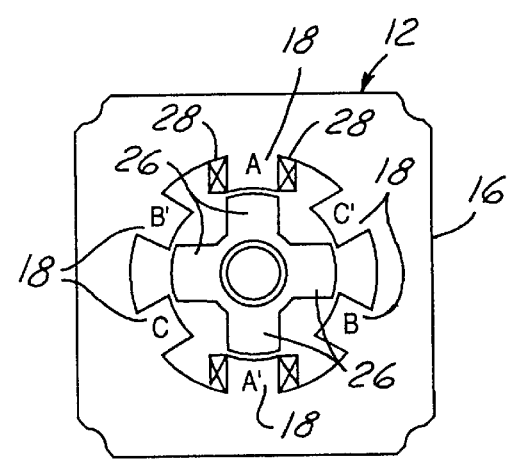
FIG. 3 is a schematic/block diagram of a two switch per phase motor control circuit.
Figure 3:
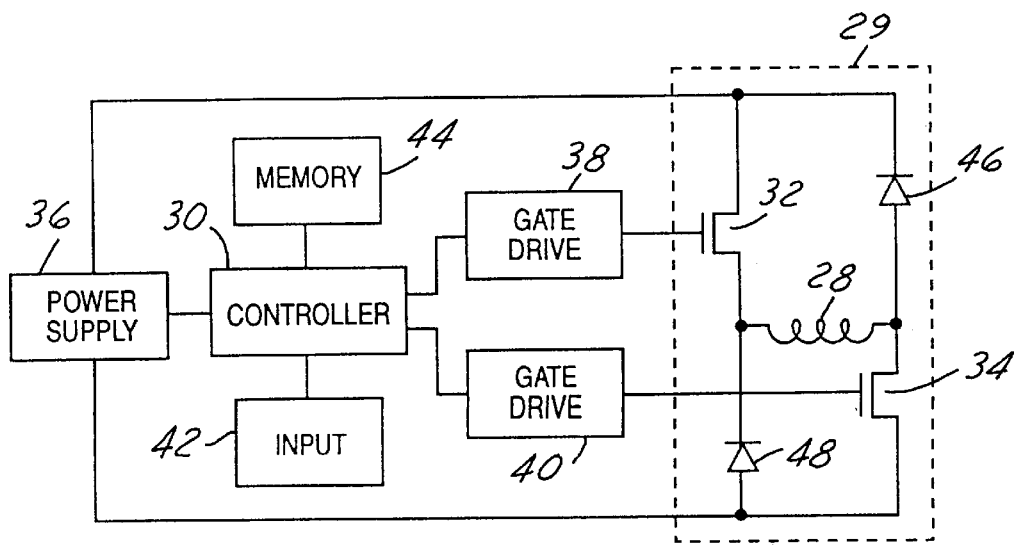

Referring now to FIG. 3, the current level within the phases of the motor is controlled by the operation of either one or two switches. FIG. 3 illustrates a two switch per phase embodiment. Only one phase 29 of the two switch per phase configuration is shown since each of the phases have identical configurations.

A controller 30 is used to control the operation of switches 32 and 34. Controller 30 is preferably a microprocessor, but one skilled in the art would recognize that discrete components may also be used.

Switches 32 and 34 are separately electrically controllable to connect winding 28 to and from a power supply 36. Switches 32 and 34 are preferably transistors and most preferably MOSFETS. Switches 32 and 34 may also be a variety of well-known switching devices such as thyristors, relays and the like.

Controller 30 controls the operation of switches 32 and 34 through gate drives 38 and 40. Gate drives 38 and 40 are conventional and well-known in the art and are used to amplify the control signal from controller 30 to provide the proper biasing to control the operation of switches 32 and 34.

Power supply 36 is also conventional and well-known in the art. Power supply 36 is sized to provide current signals to achieve a desired level of current to drive each phase 29 of motor 10.

Controller 30 controls the output of the motor, e.g., speed and torque, based on an input 42 that provides feedback as to the proper output of the motor. Input 42 may be a manually operated external control switch, feedback signals from another controller or the like (not shown). Parameters of input 42 may include phase current magnitude and angular position of rotor 24.

A memory 44 is used to store the characteristics for a desired current profile to correspond to inputs 42. For example, to provide a desired torque, current levels and timing for the current may be stored. In particular, commutation data, and switch control data for controlling the conduction of switches 32 and 34 may be provided. Memory 44 is shown as a separate component, however, memory 44 may be an integral part of controller 30.

A pair of diodes 46 and 48 are connected between winding 28 and power supply 36 (i.e., respective negative and positive busses thereof) to provide current paths for different operating modes of the windings. The function of diodes will become apparent in the description below.

Referring now to FIGS. 3 and FIGS. 4a through 4c, the operation of the control circuitry of the motor is best understood while referring to the timing diagram. The portion of the current profile between time $T_0$ and time $T_C$ is the increasing current portion. During the increasing current portion, winding 28 is connected to power supply 36 to energize winding 28 to thereby provide the proper output torque.

The period between time $T_C$ and $T_D$ is the first decaying current portion 33 of the current profile. During the first decaying current portion 33, either switch 32 or 34 is opened. Preferably, top switch 32 is controlled to a non-conductive state by controller 30 through gate drive 38. Time $T_C$ is referred to as the commutation point. At the commutation point $T_C$, current is no longer supplied by supply 36 to the motor windings. When the selected switch is opened, the motor enters what is commonly referred to as a freewheeling state in which the current in the winding circulates between winding 28 and one of diodes 46 or 48. If switch 32 is open, diode 48 and winding 28 form the freewheeling circuit. If switch 34 is open, diode 46 and winding 28 form the freewheeling circuit. It should be appreciated that in the freewheeling state, energy no longer is being supplied to or removed from winding 28 through power supply 36. The current in the winding 28 will gradually be reduced through electrical losses in the winding and associated circuitry. Because the rate of change of the first stage of decay is dependent on the electrical circuitry connected thereto, one skilled in the art would recognize that other components may be switched into the freewheeling circuit to alter the decay characteristics.

The duration of first decaying current portion is controlled by the operation of controller 30 so that a desired profile is obtained. The duration of the first decaying current portion to achieve maximum noise reduction is stored in memory 44. Controller 30 reads that duration at the appropriate time.

The period between time $T_D$ and time $T_E$ is a second decaying current portion 35 of the current profile. During the second decaying current portion 35, both switches 32 and 34 are open. The remaining current from winding 28 is forced in a reverse direction through diodes 46 and 48. The reverse direction causes a rapid decay of the remaining current in winding 28. Once again the rate of decay for the second decay period is determined by the characteristics of the electrical components connected into the circuit at that time. Of course, by switching in additional electrical components, the rate of change may be altered as desired.

Figure 4A:
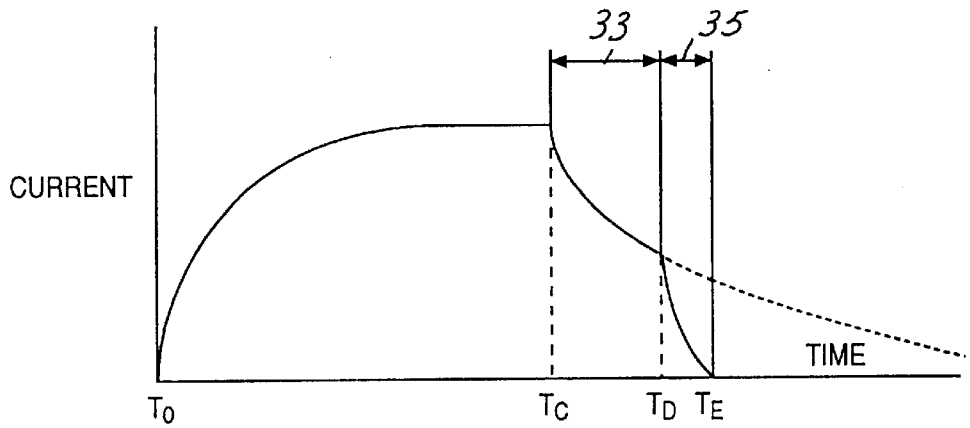
FIGS. 4a through 4c are current profiles of three windings of a motor illustrating varying first stage decay.
Figure 4B:
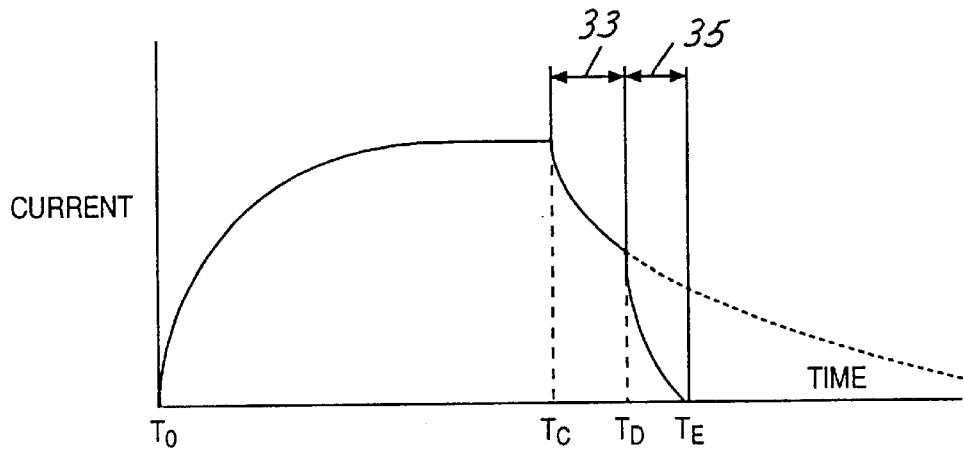
Figure 4C:
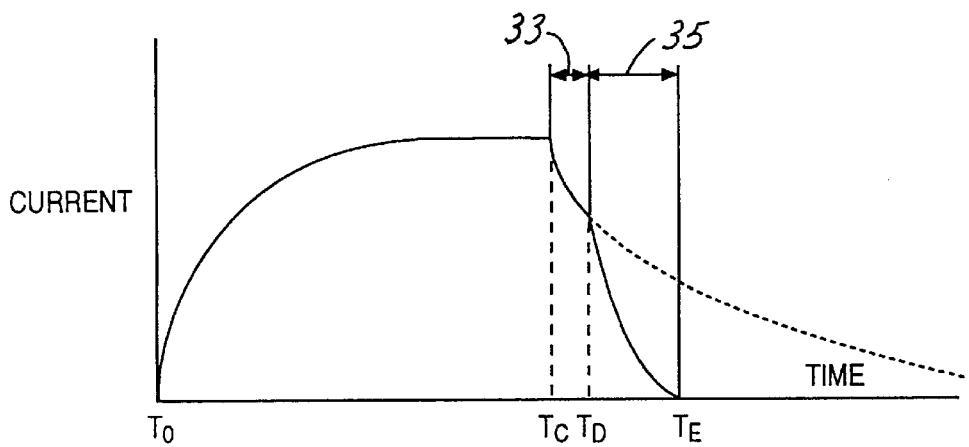

Referring now to FIGS. 4a through 4c, the first decaying current portion 33, preferably varies between the phases of the motor. FIGS. 4a through 4c represent the three windings of a three phase motor. In one embodiment, the duration of the first decaying current portion 33 of FIG. 4a is 150 microseconds. The first decaying current portion 33 of FIG. 4b is controlled to be 100 microseconds. In FIG. 4c, the first decaying current portion 33 is reduced to 50 microseconds. In the particular configuration of the motor, these settings were experimentally determined to optimally reduce noise. Of course, if a different geometry motor was used, the setting for the first decaying current portion 33 would be altered to optimize audible noise.

Figure 5:
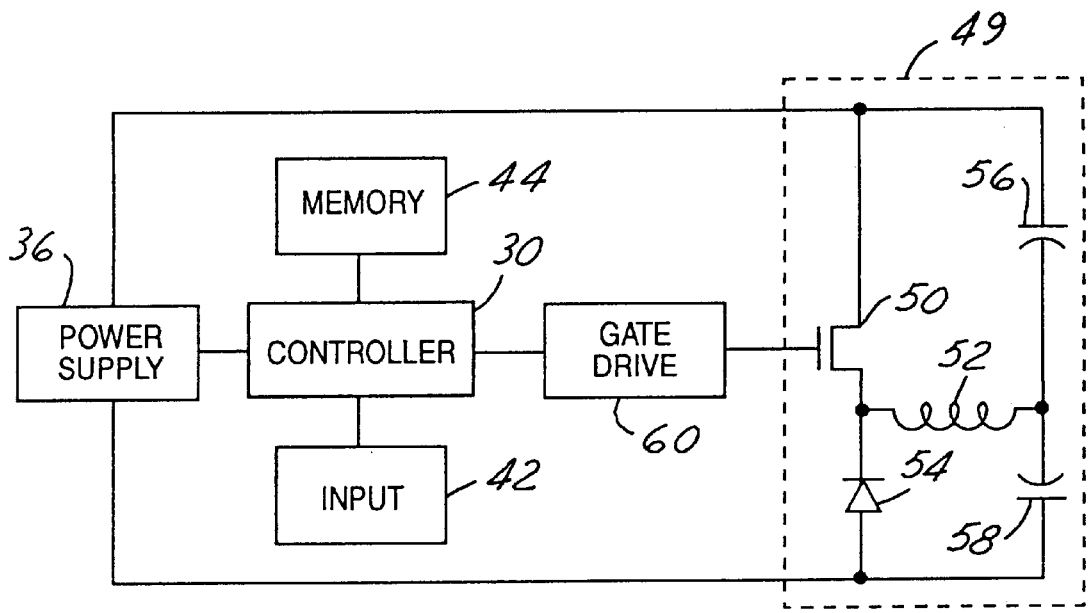
FIG. 5 is a schematic/block diagram of a one switch per phase motor control circuit.

Referring now to FIG. 5, like reference numerals are used to indicate identical components as shown in FIG. 3. Once again only a single phase 49 is shown. FIG. 5 shows a one switch per phase configuration that is common in motor drives. The operation is varied over conventional circuits to achieve the desired current profile such as that in FIG. 4. In this configuration, only one diode 54 is used. Such a configuration is used typically in a motor having an even number of machine phases. A switch 50 is used to control the current level in winding 52. Adjacent phases alternate the position of diode 54 and switch 50 as would be evident to one skilled in the art. Capacitors 56 and 58 are connected between power supply 36 and winding 52 and allow regeneration of the current. The current level in winding 58 is controlled by controller 30 through a gate drive 60. Winding 52 is powered when switch 50 is closed. Winding 52 is unpowered when switch 50 is open. To control the deenergization of winding 52 to achieve a two-stage decay such as that shown in FIG. 4, switch 50 must be pulsed since a configuration using only one switch allows only a connection to or disconnection from power supply, i.e., no freewheeling state is obtainable.

Figure 6:
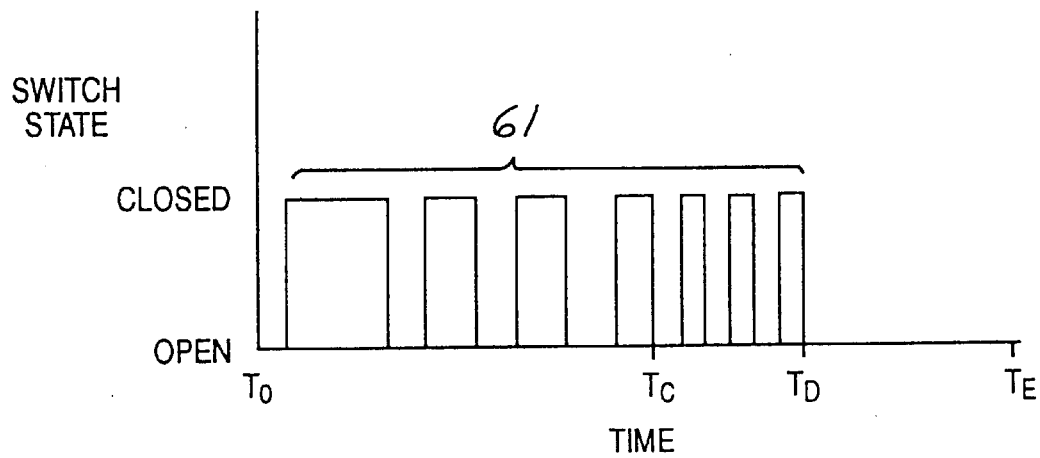
FIG. 6 is a timing diagram showing the control signal for operating the switch of FIG. 5.

Referring now to FIGS. 4, 5 and 6, the operation of the one switch per phase circuit is described in conjunction with the desired current profiles. The same current profiles as that of FIG. 4 are desired. Between time $T_0$ and time $T_C$, controller 30 closes switch 50 to connect winding 52 to power supply 36 to achieve an increasing current profile. A pulse train 61 such as that shown in FIG. 6 may be used to conform the current profile to a desired level. Pulse train 61 has a duty cycle that varies from a high duty cycle at time $T_0$ to a lower duty cycle approaching the commutation time $T_C$. One skilled in the art would also recognize various other methods of obtaining the desired output such as changing the frequency or a combination of pulse width modulating and varying the frequency.

During the first decaying current period 33, the current flow is essentially discontinued to achieve the desired profile. To achieve a slower rate of decay switch 50 may be pulsed a few times. The minimal pulsing has a net effect of controllably reducing the current in winding 52. If a slower rate of decay is desired between time period $T_C$ and time $T_D$, fewer or shorter pulses may be used. If a faster rate of decay is desired, more pulses or longer pulses may be used.

Controller 30 is used to provide pulse train 61 to gate drive 60 to energize and deenergize winding 52. Memory 44 stores the number and duration of the desired pulse train for each portion of the current profile so that the duration of the period between $T_C$ and $T_D$ is varied to optimize noise reduction between the various motor phases.

Figure 7:
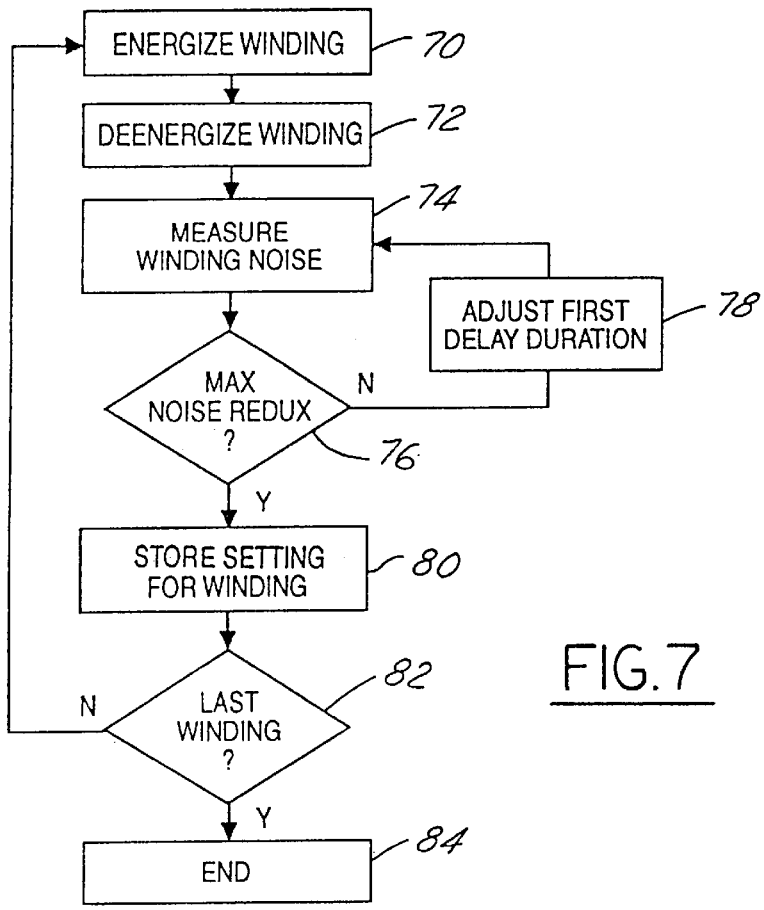
FIG. 7 is a flow chart of a method for determining the optimum current profile.

Referring now to FIG. 7, the method for determining the optimum current profile for each stage is shown. In step 70, a first winding is energized. In step 72, the winding is deenergized according to a two-step decay process. The audible noise is then measured in step 74. The noise can be measured by mounting velocity or acceleration sensors or by using a microphone to analyze the audible noise produced by the motor during operation in a conventional manner. In step 76, the noise is measured to determine whether a maximum reduction in noise has been achieved. In step 78, if the maximum noise reduction has not been achieved, the duration of the first stage of decay is adjusted and the process returned to step 70. Once the maximum noise reduction has been obtained in the first winding, the current profile (particularly the duration of the first stage of decay) is stored in the memory of the controller in step 80. Typically, the maximum noise reduction for the first phase is obtained using a duration for the first decaying current portion of about half a period of the resonant frequency of the motor.

The optimization process must be completed for each winding. Step 82 determines whether all the windings have been optimized. If the optimization has not been completed for each winding, step 70 is completed each time through the process. After the first time through the process, step 70 also energizes the previously tested windings. For example, the second time through the loop, both the first and second windings are energized so that the current profile of the second winding can be optimized. For the third winding, the first and second windings are energized according to their optimized current profiles.

Once the last winding has been optimized, step 86 ends the process. The optimized current profiles are all stored in memory 44 of controller 30 for use during operation of the motor.

Figure 8:
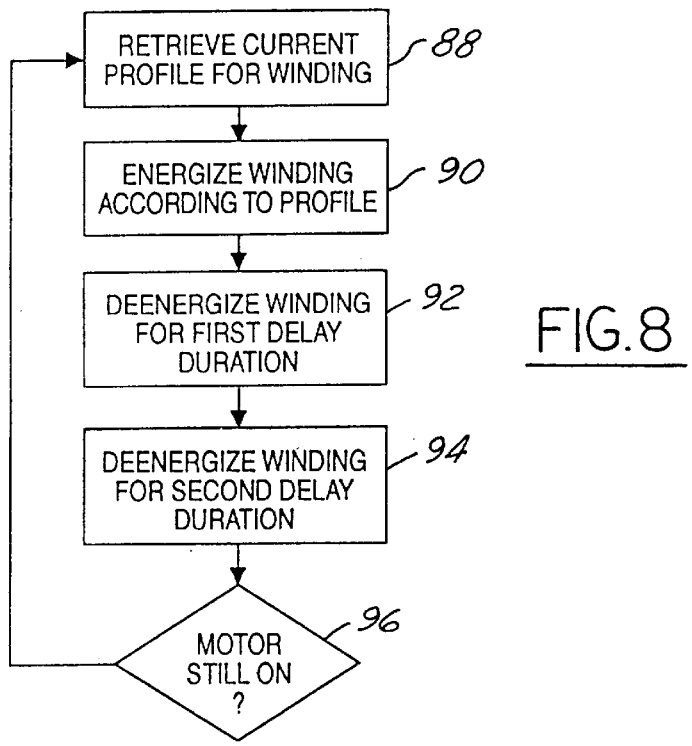
FIG. 8 is a flow chart showing the operation of the control circuit according to the present invention.

Referring now to FIG. 8, the preferred method of operating a motor having noise reduction optimization is described. In step 88, before starting up the motor, controller 30 retrieves the current profile information for a winding from memory 44. In step 90, the winding is energized according to the retrieved current profile. In step 92, the windings are deenergized for a first decaying current portion for a first duration. Each winding is likely to have different durations for the first decaying current portion. In step 94, the current is completely dissipated from the winding during a second decaying current portion. The second decaying current portion occurs at a faster rate than the first decaying current portion. If the motor is still on in step 96, step 88 is repeated for each of the windings.

While the best mode for carrying out the present invention has been described in detail, those familiar with the art to which this invention relates will recognize various alternative designs and embodiments for practicing the invention as defined by the following claims:

What is claimed is:

1. An apparatus, comprising:
   means for energizing a first winding and a second winding of a motor;
   means for controlling a first current in said first winding according to a first current profile and for controlling a second current in said second winding according to a second current profile; and,
   a memory for storing a first set of data corresponding to said first current profile and a second set of data corresponding to said second current profile
   wherein said first current profile is different than said second current profile.

2. The apparatus of claim 1 wherein each of said first and second current profiles includes a decreasing current portion and said decreasing current portion of said first current profile is different than said decreasing current portion of said second current profile.

3. The apparatus of claim 2 wherein said decreasing current portion of said first current profile has a first duration and said decreasing current portion of said second current profile has a second duration, said first duration different than said second duration.

4. The apparatus of claim 1 wherein each of said first and second current profiles includes an increasing current portion and a decreasing current portion having a first stage and a second stage.

5. The apparatus of claim 4 wherein said first stage of said first current profile is different than said first stage of said second current profile.

6. The apparatus of claim 5 wherein said first stage of said first current profile has a first duration and said first stage of said second current profile has a second duration, said first duration different than said second duration.

7. The apparatus of claim 1, further including means for providing a feedback input signal wherein said controlling means is responsive to said feedback input signal.

8. An apparatus, comprising:
   means for energizing a first winding and a second winding of a motor wherein said energizing means includes
      first, second, third, and fourth switches, said first and second switches connected to said first winding and said third and fourth switches connected to said second winding; and
   means for controlling a first current in said first winding according to a first current profile and for controlling a second current in said second winding according to a second current profile wherein said first current profile is different than said second current profile, said controlling means including
      means for opening said first switch to form a first decreasing portion of said first current profile;
      means for opening said second switch a first predetermined time after opening said first switch to form a second decreasing portion of said first current profile;
      means for opening said third switch to form a first decreasing portion of said second current profile; and,
      means for opening said fourth switch a second predetermined time after opening said third switch to form a second decreasing portion of said second current profile, said first predetermined time different than said second predetermined time.

9. An apparatus, comprising:
   means for energizing a first winding and a second winding of a motor, said energizing means including
      first and second switches connected to said first and second windings, respectively; and
   means for controlling a first current in said first winding according to a first current profile and for controlling a second current in said second winding according to a second current profile wherein said first current profile is different than said second current profile, said controlling means including
      means for pulsing said first switch for a first predetermined time to form a first decreasing portion of said first current profile; and,
      means for pulsing said second switch for a second predetermined time to form a first decreasing portion of said second current profile, said first predetermined time different than said second predetermined time.

10. A method for controlling a motor, comprising the steps of:

energizing a first winding;

controlling a first current level in said first winding according to a first current profile;

energizing a second winding;

controlling a second current level in said second winding according to a second current profile wherein said first current profile is different than said second current profile and wherein said step of controlling a first current level includes the substep of decreasing said first current level in a first stage and a second stage and said step of controlling a second current level includes the substep of decreasing said second current level in a third stage and a fourth stage, said third stage different than said first stage.

11. The method of claim 10 wherein said first stage has a first duration, said third stage has a second duration, and said first duration is different than said third duration.

12. The method of claim 10 wherein said step of controlling a first current level includes the substep of increasing said first current level to a first commutation point, and said step of controlling a second current level includes the substep of increasing said second current level to a second commutation point.

13. The method of claim 12 wherein said first stage has a first duration, said third stage has a second duration, and said first stage is different than said third stage.

14. The method of claim 10, further including the step of providing a feedback input signal.

15. A method for controlling a motor, comprising the steps of:

energizing a first winding;

controlling a first current level in said first winding according to a first current profile;

energizing a second winding;

controlling a second current level in said second winding according to a second current profile wherein said first current profile is different than said second current profile providing first, second, third, and fourth switches, said first and second switches connected to said first winding, said third and fourth switches connected to said second winding wherein said step of controlling a first current level includes the substeps of opening said first switch to form a first decreasing current portion of said first current profile; and opening said second switch a first predetermined time after opening said first switch to form a second decreasing current portion of said first current profile, and said step of controlling a second current level includes the substeps of opening said third switch to form a first decreasing current portion of said second current profile; and opening said fourth switch a second predetermined time after opening said third switch to form a second decreasing current portion of said second current profile, said first predetermined time different than said second predetermined time.

16. A method for controlling a motor, comprising the steps of:

energizing a first winding;

controlling a first current level in said first winding according to a first current profile;

energizing a second winding;

controlling a second current level in said second winding according to a second current profile wherein said first current profile is different than said second current profile providing first and second switches connected to said first and second windings, respectively wherein said step of controlling a first current level includes the substep of pulsing said first switch for a first predetermined time to form a first decreasing current portion of said first current profile and said step of controlling a second current level includes the substep of pulsing said second switch for a second predetermined time to form a first decreasing current portion of said second current profile, said first predetermined time different than said second predetermined time.

17. A method for controlling a motor, comprising the steps of:

retrieving a first set of data corresponding to a first current profile from a memory; and, retrieving a second set of data corresponding to a second current profile from said memory energizing a first winding;

controlling a first current level in said first winding according to said first current profile;

energizing a second winding;

controlling a second current level in said second winding according to said second current profile wherein said first current profile is different than said second current profile.

18. An apparatus, comprising:

means for energizing a first winding of a first motor phase of a variable reluctance motor and a second winding of a second motor phase of said variable reluctance motor; and, means for controlling a first current in said first winding according to a first current profile from a memory and for controlling a second current in said second winding according to a second current profile from said memory wherein said first current profile is different from said second current profile.

* * * * *